United States Patent
Sahlin et al.

(10) Patent No.: US 10,165,570 B2
(45) Date of Patent: Dec. 25, 2018

(54) ADAPTIVE BEAMFORMING

(71) Applicant: Telefonaktiebolaget L M Ericsson (publ), Stockholm (SE)

(72) Inventors: Henrik Sahlin, Mölnlycke (SE); Mona Hashemi, Göteborg (SE); Mirsad Cirkic, Linköping (SE); Joel Berglund, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 14/438,774

(22) PCT Filed: Apr. 23, 2015

(86) PCT No.: PCT/EP2015/058787
§ 371 (c)(1),
(2) Date: Apr. 27, 2015

(87) PCT Pub. No.: WO2016/169598
PCT Pub. Date: Oct. 27, 2016

(65) Prior Publication Data
US 2016/0316465 A1    Oct. 27, 2016

(51) Int. Cl.
*H04W 72/04* (2009.01)
*H04B 7/06* (2006.01)
*H04B 7/024* (2017.01)

(52) U.S. Cl.
CPC ........ *H04W 72/046* (2013.01); *H04B 7/0617* (2013.01); *H04B 7/024* (2013.01)

(58) Field of Classification Search
None
See application file for complete search history.

(56) References Cited

U.S. PATENT DOCUMENTS

2009/0052389 A1* 2/2009 Qin ................. H04W 74/08
                                                  370/329
2010/0054200 A1* 3/2010 Tsai .............. H04B 7/0408
                                                  370/329
(Continued)

FOREIGN PATENT DOCUMENTS

GB        2 477 979 A    8/2011

OTHER PUBLICATIONS

Zeng et al: "Opportunistic Multiuser Beamforming based o Spatial Signature Matching", IEEE International Symposium on Personal, Indoor Ah Mobile Radio Communications. PIMRC, IEEE; PI, XX, Sep. 1, 2007 (Sep. 1, 2007), pp. 1-5, XP031168707, DOI: 10.1109/PIMRC.2007.4394729 ISBN: 978-1-4244-1143-6.*
(Continued)

*Primary Examiner* — Joseph A Bednash
(74) *Attorney, Agent, or Firm* — Sage Patent Group (57) ABSTRACT

There is provided mechanisms for adaptive beamforming. A method is performed by a first network device. The method comprises acquiring beamforming information indicating spatial directions in which an identification signal is to be transmitted. The method comprises transmitting the identification signal in a transmission pattern using directional beams in the spatial directions towards second network devices. The identification signal is transmitted such that the identification signal occupies a larger portion of communications resources when transmitted in spatial directions with high second network device presence than in spatial directions with low second network device presence.

13 Claims, 8 Drawing Sheets

(56) References Cited

U.S. PATENT DOCUMENTS

2014/0010131 A1\* 1/2014 Gaal ................ H04W 52/0229
                                                370/311
2014/0073337 A1  3/2014 Hong
2014/0120926 A1\* 5/2014 Shin ..................... H04W 56/00
                                                455/450

OTHER PUBLICATIONS

C. Nicolas Barati, S. Amir Hosseini, Sundeep Rangan, Pei Liu, Thanasis Korakis, Shivendra S. Panwar "Directional Cell Search for Millimeter Wave Cellular Systems", Cornell University Library.
Sundeep Rangan, Theodore S. Rappaport, and Elza Erkip, Fellow IEEE, "Millimeter-Wave Cellular Wireless Networks: Potentials and Challenges", Proceedings of the IEEE, vol. 102 , Issue: 3, 2014 , pp. 366-385.
Meng et al., "Opportunistic Multiuser Beamforming based on Spatial Signature Matching", IEEE International Symposium on Personal, Indoor and Mobile Radio Communications, PIMRC, IEEE: PI, XX, Sep. 1, 2007, pp. 1-5, XP031168707.
Notification of Transmittal of the International Search Report and The Written Opinion of the International Searching Authority, or the Declaration, issued in PCT/EP2015/058787, dated May 2, 2016, 8 pages.
Written Opinion of the International Searching Authority issued in PCT/EP2015/058787, dated May 2, 2015, 11 pages.

\* cited by examiner

ADAPTIVE BEAMFORMING

CROSS REFERENCE TO RELATED APPLICATION

This application is a 35 U.S.C. 371 National Phase Entry Application from PCT/EP2015/058787, filed Apr. 23, 2015, the disclosure of which is incorporated herein in its entirety by reference.

TECHNICAL FIELD

Embodiments presented herein relate to adaptive beamforming, and particularly to methods, a first network device, a second network device, computer programs, and a computer program product for adaptive beamforming.

BACKGROUND

In communications networks, there may be a challenge to obtain good performance and capacity for a given communications protocol, its parameters and the physical environment in which the communications network is deployed.

For example, when a network device acting as a wireless device, such as a user equipment, is powered on, or when it moves between cells during a handover procedure, it receives and synchronizes to downlink signals as transmitted by a network device acting as a radio access network node, such as an evolved node B, in a cell search procedure. One purpose of such a cell search procedure is to identify the best cell or find the target cell for the wireless device and to achieve time and frequency synchronization to the network, as represented by the radio access network node, in the downlink (i.e. from the radio access network node to wireless device).

Figure 9:
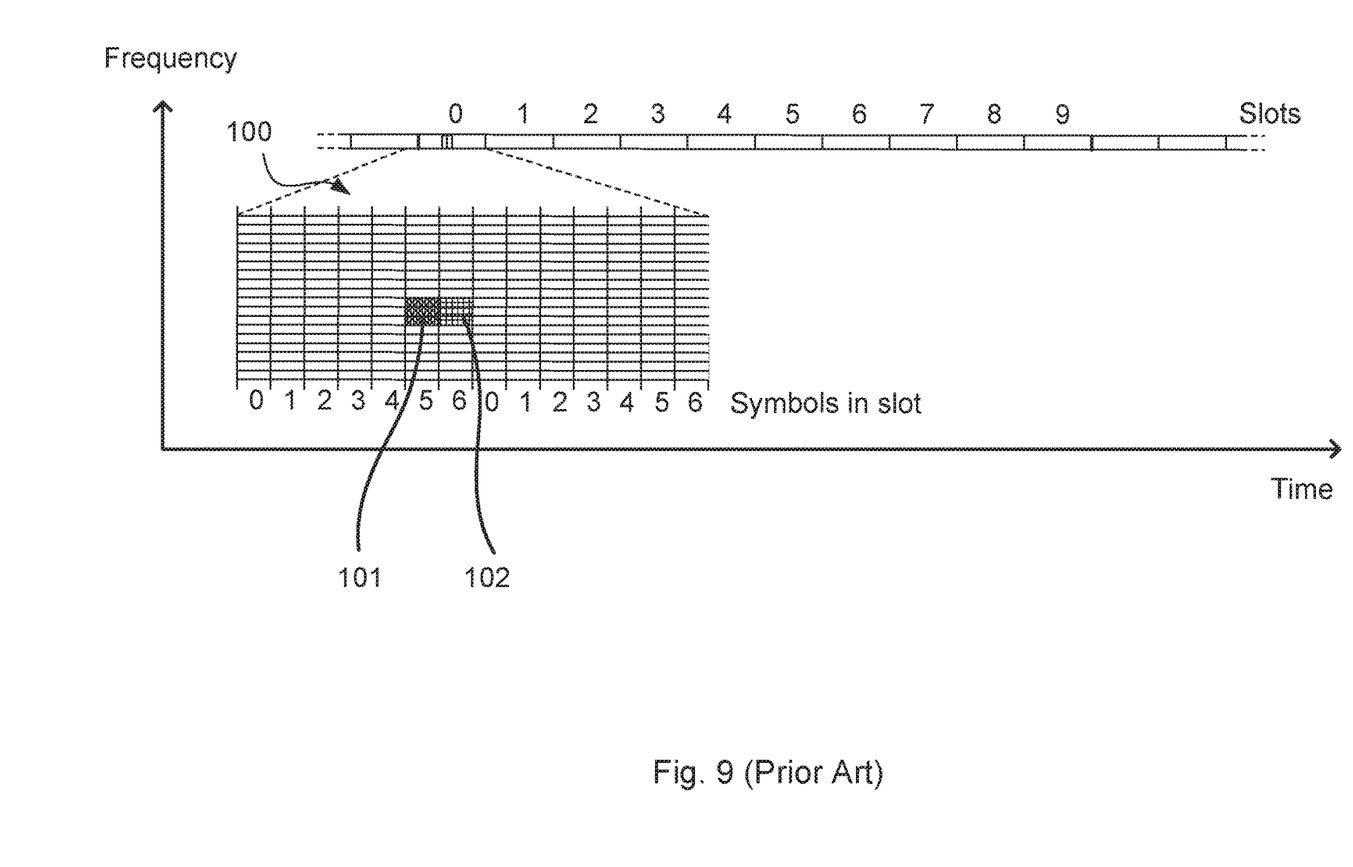
FIGS. 9, 11, and 12 are schematic illustrations of transmission of synchronization signals according to prior art.

Primary and Secondary Synchronization Signals (PSS and SSS, respectively) are examples of signals used during cell search. FIG. 9 schematically illustrates transmission of PSS 101 and SSS 102.

Figure 10:
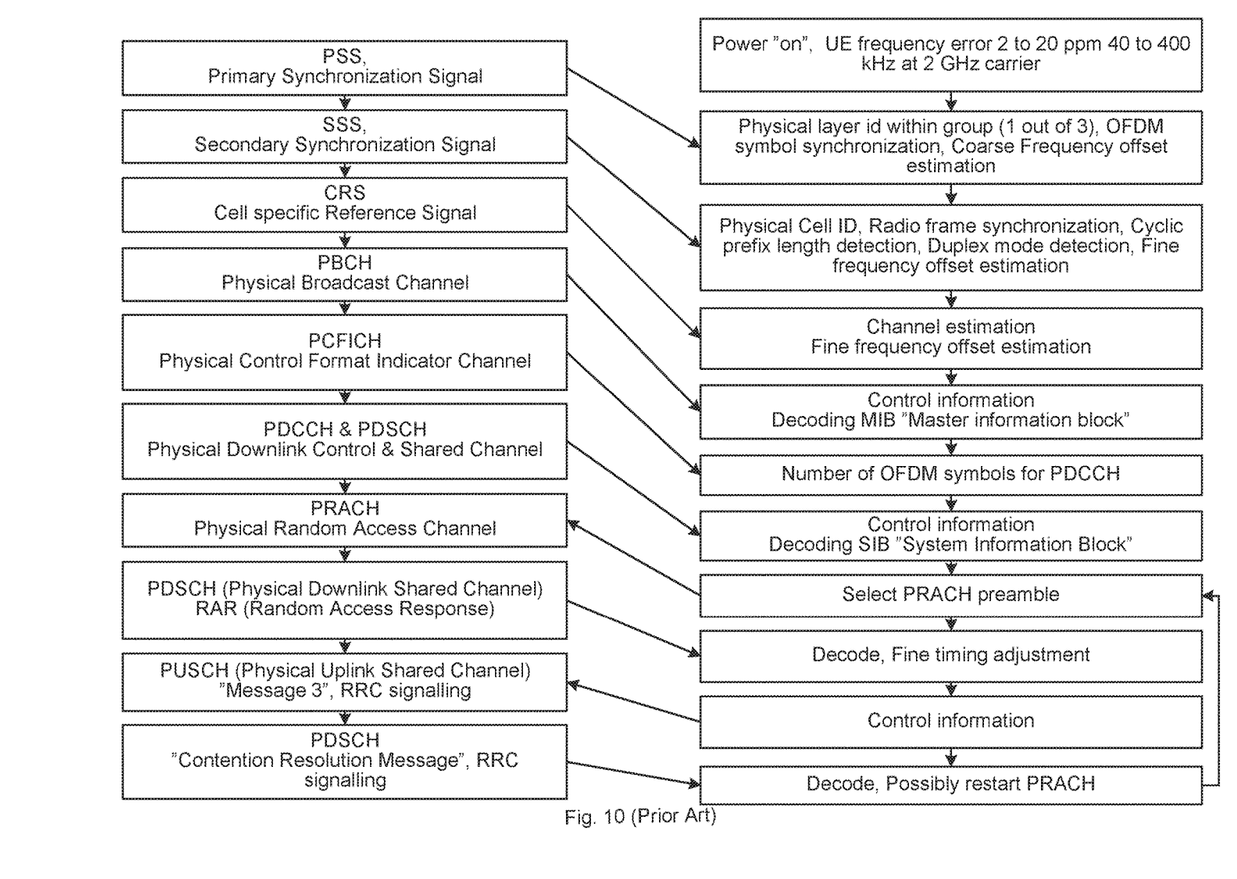
FIG. 10 is a flowchart of a methods according to prior art.

A simplified initial cell search and handover procedure is illustrated in FIG. 10. Description thereof will now follow. A wireless device has typically a frequency error of 2 to 20 ppm (Part Per Million) at power on, which corresponds to 4 to 40 kHz frequency error at a carrier frequency of 2 GHz. The wireless device then tries to detect PSS from which it can derive the cell ID within a cell-identity group, which consists of three different cell identities corresponding to three different PSS. In this detection, the wireless device thus has to blindly search for all of these three possible cell identity groups. The wireless device also achieves an orthogonal frequency-division multiplexing (OFDM) symbol synchronization and a coarse frequency offset estimation with an accuracy of about 1 kHz. The latter is estimated by the wireless device by evaluating several hypotheses of the frequency error.

The wireless device can then continue to detect the SSS from which it acquires the physical cell ID and achieves radio frame synchronization. Here, the wireless device also detects if normal or extended cyclic prefix is used. If the wireless device is not preconfigured for either time-division duplexing (TDD) or frequency-division duplexing (FDD), the wireless device can detect the duplex mode by the position in the frame of detected SSS in relation to detected PSS. Fine frequency offset estimation can be estimated by correlating PSS and SSS. Alternatively, this fine frequency offset estimation is estimated by using the Cell specific Reference Signals (CRS).

After these synchronizations, the wireless device can receive and decode the Master Information Block (MIB) which is transmitted on the Physical Broadcast Channel (PBCH). Additional broadcasted information is transmitted in the System-Information Blocks (SIBs) which are carried by Physical Downlink Shared Channel (PDSCH). This PDSCH can be decoded after reading the Physical Control Format Indicator Channel (PCFICH) and the Physical Downlink Control Channel (PDCCH). Here, SIB2 includes information regarding uplink cell bandwidth and random access configurations. Thus, after successful decoding of SIB2, the wireless device can transmit a preamble on the Physical Random-Access Channel (PRACH) to the radio access network node and receive a Random Access Response (RAR) on the PDSCH from the radio access network node.

In general terms, PRACH is used for initial access and timing offset estimation for a wireless device. Upon reception in the radio access network node, the PRACH must thus be detected with high accuracy and an accurate timing offset estimation must be done. One PRACH can allocate several sub-frames, which is beneficial in large cells in order to improve coverage. However, one common (and smallest) allocation is to use one sub-frame. Here the PRACH is also configured with a periodicity, from once every second frame to once every subframe, i.e. with an interval spanning from 20 ms to 1 ms.

Figure 11:
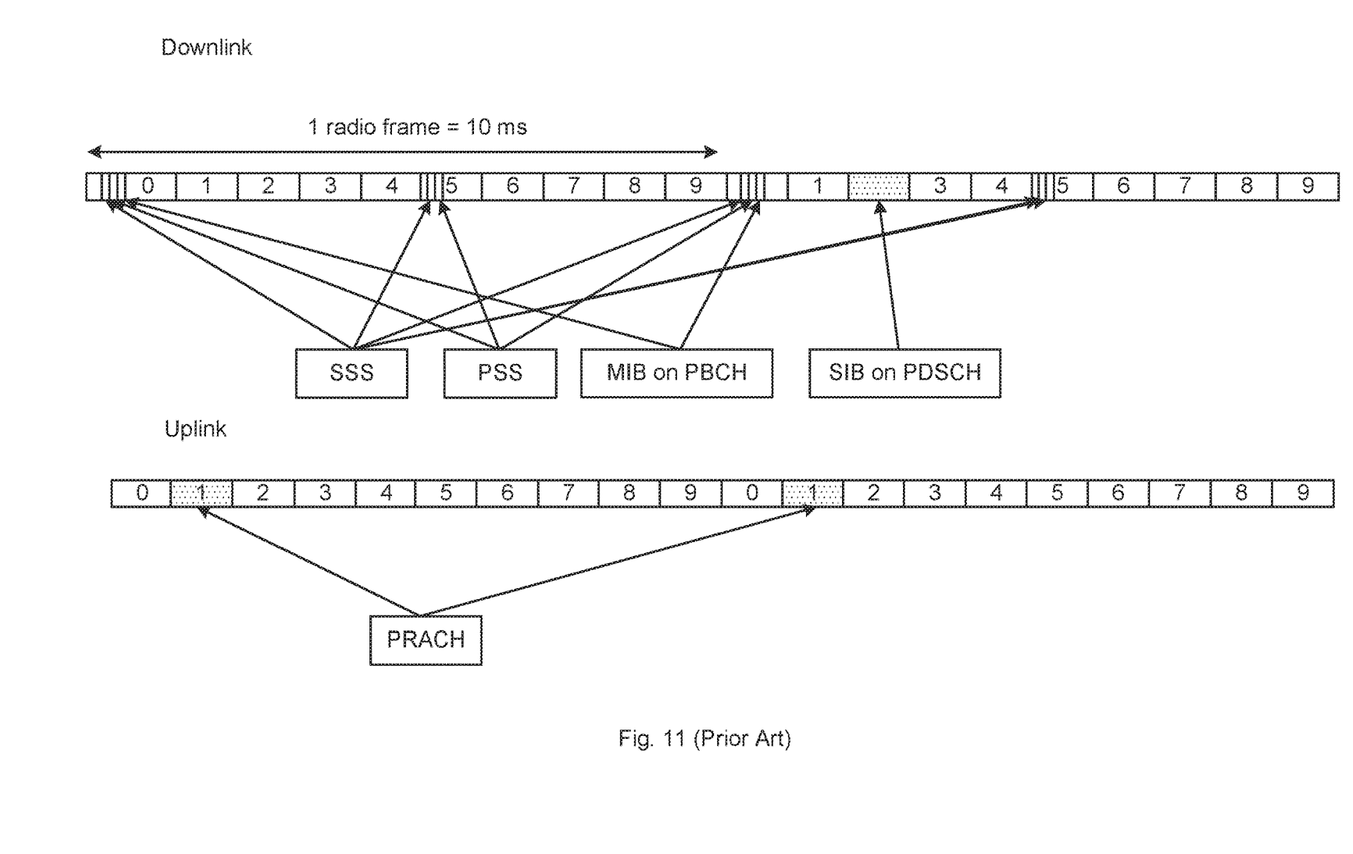

One mechanism to improve coverage of cell search signals is to use several antenna elements such that beamforming can be used to improve the signal-to-interference-plus-noise ratio (SINR), see illustration in FIG. 11. FIG. 11 schematically illustrates transmission of SSS, PSS, MIB, SIB and PRACH. A directional cell search procedure is proposed by C. Nicolas Barati, S. Amir Hosseini, Sundeep Rangan, Pei Liu, Thanasis Korakis, Shivendra S. Panwar in "Directional Cell Search for Millimeter Wave Cellular Systems", Cornell University Library. Here the radio access network node periodically transmits synchronization signals in random directions to scan the angular space.

The need for designing synchronization and broadcast signals used in the initial cell search for scanning over a range of angles is also discussed by Sundeep Rangan, Theodore S. Rappaport, and Elza Erkip in "Millimeter-Wave Cellular Wireless Networks: Potentials and Challenges", in the Proceedings of the IEEE, Volume: 102, Issue: 3, 2014, Page(s): 366-385.

However, the average time might be comparatively large until a wireless device receives a broadcast signal with high enough signal-to-noise ratio (SNR) with random or sequential beamforming of the broadcast signals and channels. Furthermore, when many wireless devices simultaneously receive the broadcast signals and channels, these wireless devices might also try to access the radio access network node by the PRACH channel simultaneously. This may result in congestion.

The inventors of the herein disclosed embodiments have realized that at least the issues disclosed above may be mitigated, or even resolved, by the use of adaptive beamforming. Hence, there is a need for an improved adaptive beamforming.

SUMMARY

An object of embodiments herein is to provide efficient adaptive beamforming.

According to a first aspect there is presented a method for adaptive beamforming. The method is performed by a first network device. The method comprises acquiring beamforming information indicating spatial directions in which an identification signal is to be transmitted. The method comprises transmitting the identification signal in a transmission pattern using directional beams in the spatial directions towards second network devices. The identification signal is transmitted such that the identification signal occupies a larger portion of communications resources when transmitted in spatial directions with high second network device presence than in spatial directions with low second network device presence.

Advantageously this provides efficient adaptive beamforming.

Advantageously this enables second network devices being wireless devices in a cell served by the first network device to, on average, experience a short time until being attached to a cell, for example shorter than if the communications resources were broadcasted uniformly in the cell.

Advantageously this enables not all second network devices to receive the identification signal, for example being a broadcast signal or a broadcast channels simultaneously. This may result in few simultaneous transmissions of responses, such as PRACH, to the first network device. For example, this may result in fewer simultaneous transmissions of responses compared than if the communications resources were broadcasted uniformly in the cell. This results in less congestion in the network.

According to a second aspect there is presented a first network device for adaptive beamforming. The first network device comprises a processing unit. The processing unit is configured to cause the first network device to acquire beamforming information indicating spatial directions in which an identification signal is to be transmitted. The processing unit is configured to cause the first network device to transmit the identification signal in a transmission pattern using directional beams in the spatial directions towards second network devices. The identification signal is transmitted such that the identification signal occupies a larger portion of communications resources when transmitted in spatial directions with high second network device presence than in spatial directions with low second network device presence.

According to a third aspect there is presented a computer program for adaptive beamforming, the computer program comprising computer program code which, when run on a processing unit of a first network, causes the first network to perform a method according to the first aspect.

According to a fourth aspect there is presented a method for adaptive beamforming. The method is performed by a first network device. The method comprises acquiring beamforming information indicating spatial directions in which an identification signal is to be received from at least one second network device. The method comprises receiving the identification signal from the at least one second network device in at least one directional beam indicated by the spatial directions. The identification signal is by the first network device received such that reception of the identification signal utilizes a larger portion of communications resources when received in spatial directions with high second network device presence than in spatial directions with low second network device presence.

According to a fifth aspect there is presented a first network device for adaptive beamforming. The first network device comprises a processing unit. The processing unit is configured to cause the first network device to acquire beamforming information indicating spatial directions in which an identification signal is to be received from at least one second network device. The processing unit is configured to cause the second network device to receive the identification signal from the at least one second network device in at least one directional beam indicated by the spatial directions. The identification signal is by the first network device received such that reception of the identification signal utilizes a larger portion of communications resources when received in spatial directions with high second network device presence than in spatial directions with low second network device presence.

According to a sixth aspect there is presented a computer program for adaptive beamforming, the computer program comprising computer program code which, when run on a processing unit of a first network device, causes the first network device to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
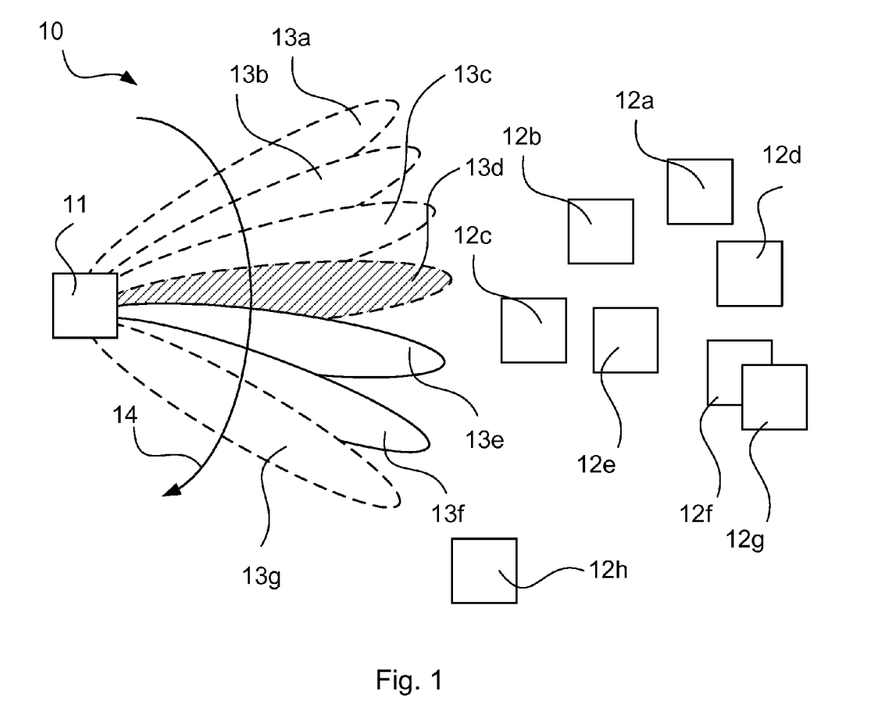
FIG. 1 is a schematic diagram illustrating a communication network according to embodiments.

FIG. 1 is a schematic diagram illustrating a communications network 10 where embodiments presented herein can be applied. The communications network 10 comprises a first network device 11 and at least one second network device 12a-12h.

Figure 12:
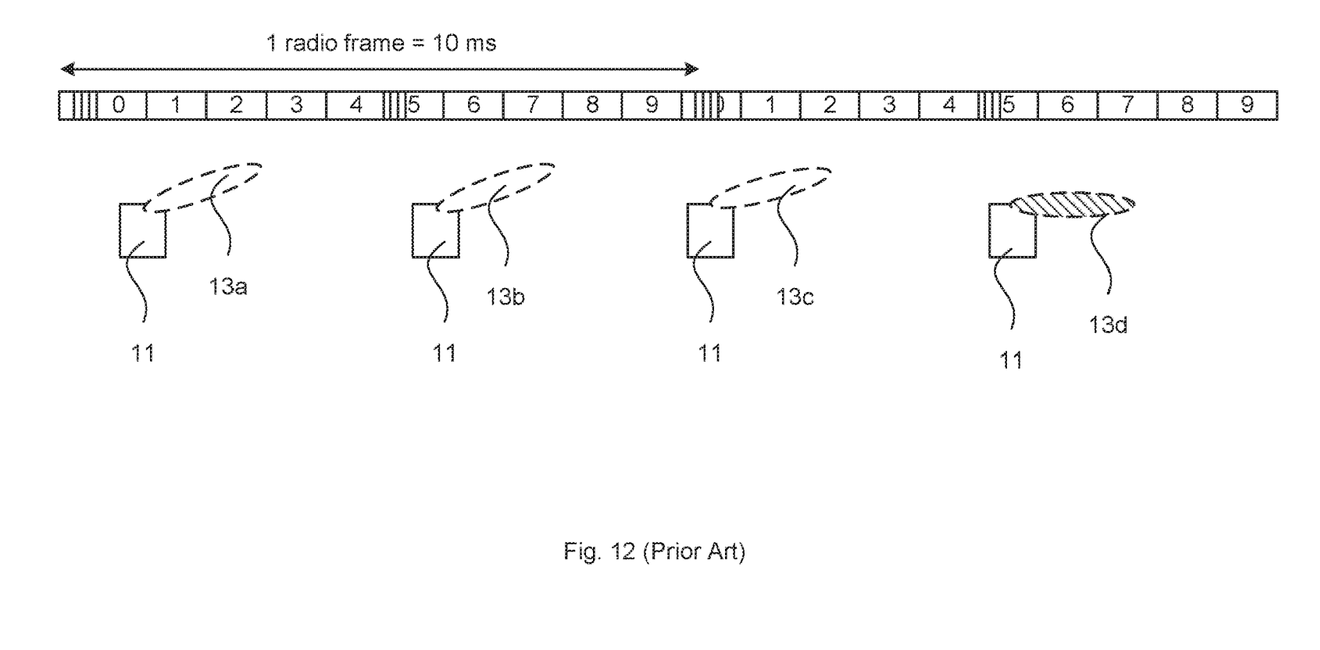

Assume first that in the schematic illustration of FIG. 1 the first network device 11 sequentially transmits PSS in different directions using directional beams 13a-13g, as in FIG. 12 (i.e., sequentially along the general direction indicated by arrow 14). Assume also that the second network devices 12a-12h are to receive the PSS from the first network device 11. If the coverage region (i.e., the region defined by where the second network devices 12a-12h are able to receive the PSS) of the first network device 11 has a non-uniform distribution of users, then it may be beneficial for the network for the first second network device 11 to transmit PSS (and other broadcast signals and channels), more frequently in the directions in which the user density is high. The second network devices 12a-12g in the high density regions will then on average experience a lower time until synchronization and configuration compared to the few second network devices 12h located in regions where the user density is low. In average, this will lead to a decreased time for initial setup.

After successful PSS and SSS detection, the second network devices 12a-12h may detect the MIB on PBCH and the SIB on PDSCH. The second network devices 12a-12h may then transmit PRACH on an available PRACH resource, where the configuration of PRACH resources is given by SIB2. In FIG. 11 PRACH is configured to subframe 1 in each frame. If the synchronization signals and the configurations are transmitted seldom in the direction with high density of second network devices 12a-12g, then there will be many second network devices 12a-12g which simultaneously try to transmit PRACH resulting in an increased risk of congestion. However, if the first network device 11 transmits synchronization signals (PSS/SSS) and broadcast control channels towards the area with a high second network device density more often, then the risk for collision of PRACH is lowered.

The herein disclosed embodiments discloses a first network device 11 which is configured for beamforming, where identification signals, such as broadcast information, is transmitted more frequently in those spatial directions with high second network device density compared to the directions in which the second network device density is low.

The embodiments disclosed herein thus relate to adaptive beamforming. In order to obtain such adaptive beamforming there is provided a first network device 11, methods performed by the first network device 11, computer programs comprising code, for example in the form of a computer program product, that when run on a processing unit of the first network device 11, causes the first network device 11 to perform the methods. In order to obtain such adaptive beamforming there is, optionally, further provided a second network device 12a-12h, a method performed by the second network device 12a-12h, and a computer program comprising code, for example in the form of a computer program product, that when run on a processing unit of the second network device 12a-12h, causes the second network device 12a-12h to perform the method.

Figure 2A:
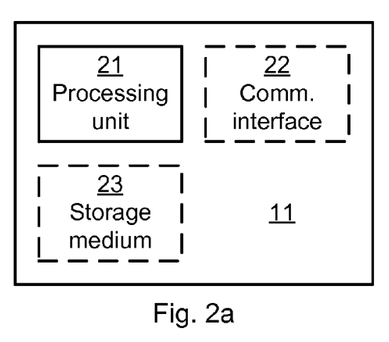
FIG. 2a is a schematic diagram showing functional units of a first network device according to an embodiment.

FIG. 2a schematically illustrates, in terms of a number of functional units, the components of a first network device 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The first network device 11 may further comprise a communications interface 22 for communications with at least one second network device 12a-12h and/or at least one further first network device 11. As such the communications interface 22 may comprise one or more transmitters and receivers, comprising analogue and digital components and a suitable number of antennas for wireless communications and ports for wireline communications. The processing unit 21 controls the general operation of the first network device 11 e.g. by sending data and control signals to the communications interface 22 and the storage medium 23, by receiving data and reports from the communications interface 22, and by retrieving data and instructions from the storage medium 23. Other components, as well as the related functionality, of the first network device 11 are omitted in order not to obscure the concepts presented herein.

Figure 2B:
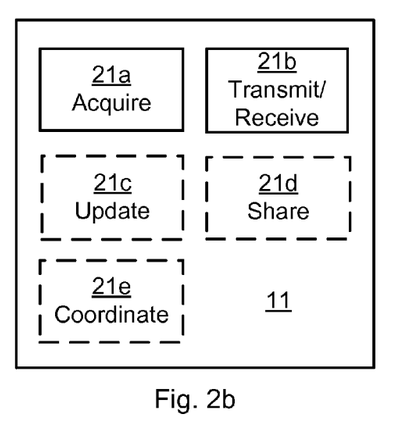
FIGS. 2b, 2c, and 2d are schematic diagrams showing functional modules of a first network device according to an embodiments.

FIG. 2b schematically illustrates, in terms of a number of functional modules, the components of a first network device 11 according to an embodiment. The first network device 11 of FIG. 2b comprises a number of functional modules; an acquire module 21a configured to perform below steps S104, S108, and a transmit and/or receive module 21b configured to perform below steps S102, S104a, S106. The first network device 11 of FIG. 2b may further comprises a number of optional functional modules, such as any of an update module 21C configured to perform below step S110, a share module 21d configured to perform below steps S112, S114, and a coordinate module 21e configured to perform below step S116. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to from the storage medium 23 fetch instructions as provided by a functional module 21a-e and to execute these instructions, thereby performing any steps S102-S116 as will be disclosed hereinafter.

Figure 2C:
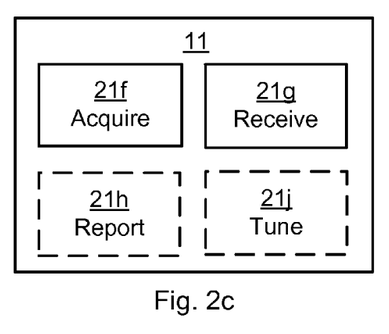

FIG. 2c schematically illustrates, in terms of a number of functional modules, the components of a first network device 11 according to an embodiment. The first network device 11 of FIG. 2c comprises a number of functional modules; an acquire module 21f configured to perform below step S202, and a receive module 21g configured to perform below steps S204, S204a. The first network device 11 of FIG. 2c may further comprises a number of optional functional modules, such as any of a report module 21h configured to perform below step S206, and a tune module 21*j* configured to perform below step S204*b*. The functionality of each functional module 21*f*-21*j* will be further disclosed below in the context of which the functional modules 21*f*-21*j* may be used. In general terms, each functional module 21*f*-21*j* may be implemented in hardware or in software. Preferably, one or more or all functional modules 21*f*-21*j* may be implemented by the processing unit 21, possibly in cooperation with functional units 22 and/or 23. The processing unit 21 may thus be arranged to from the storage medium 23 fetch instructions as provided by a functional module 21*f*-21*j* and to execute these instructions, thereby performing any steps S202-S206 as will be disclosed hereinafter.

Figure 2D:
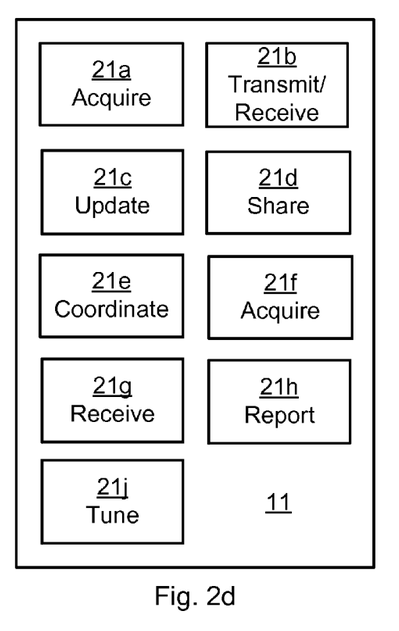

FIG. 2*d* schematically illustrates, in terms of a number of functional modules, the components of a first network device 11 according to an embodiment. The first network device 11 of FIG. 2*d* comprises the functional modules of the first network device 11 of FIG. 2*b* and the first network device 11 of FIG. 2*c* and is hence configured to perform any steps S102-S116 and S202-S206 as will be disclosed hereinafter.

With regards to the above example implementations of the first network device 11 and the second network device 12*a*-12*h* it is noted that the first network device 11 and the second network device 12*a*-12*h* may comprise identical hardware and/or software and hence be defined in terms of their functionality only. That is, a single network device may be configured to alternatingly perform the functionality of the first network device 11 and the second network device 12*a*-12*h*, respectively.

Figure 3:
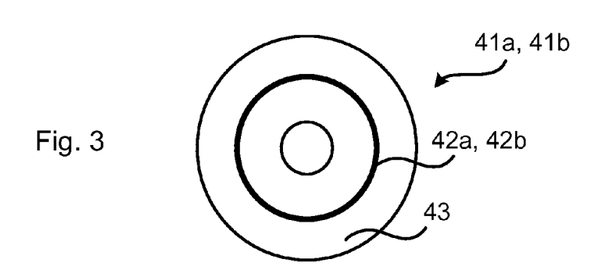
FIG. 3 shows one example of a computer program product comprising computer readable means according to an embodiment.

FIG. 3 shows one example of a computer program product 41*a*, 41*b* comprising computer readable means 43. On this computer readable means 43, a computer program 42*a* can be stored, which computer program 42*a* can cause the processing unit 21 and thereto operatively coupled entities and devices, such as the communications interface 22 and the storage medium 23, to execute methods according to embodiments described herein. The computer program 42*a* and/or computer program product 41*a* may thus provide means for performing any steps S102-S116 (see below) of the first network device 11 as herein disclosed. On this computer readable means 43, a computer program 42*b* can be stored, which computer program 42*b* can cause the processing unit 21 and thereto operatively coupled entities and devices, such as the communications interface 22 and the storage medium 23, to execute methods according to embodiments described herein. The computer program 42*b* and/or computer program product 41*b* may thus provide means for performing any steps S202-S206 (see below) of the first network device 11 as herein disclosed.

In the example of FIG. 3, the computer program product 41*a*, 41*b* is illustrated as an optical disc, such as a CD (compact disc) or a DVD (digital versatile disc) or a Blu-Ray disc. The computer program product 41*a*, 41*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42*a*, 42*b* is here schematically shown as a track on the depicted optical disk, the computer program 42*a*, 42*b* can be stored in any way which is suitable for the computer program product 41*a*, 41*b*.

Figure 4:
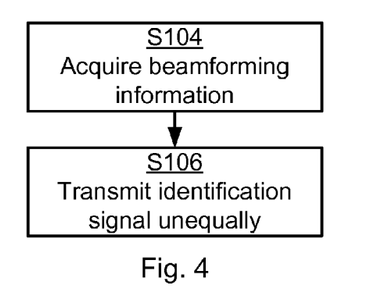
FIGS. 4, 5, 6, 7, and 8 are flowcharts of methods according to embodiments.
Figure 5:
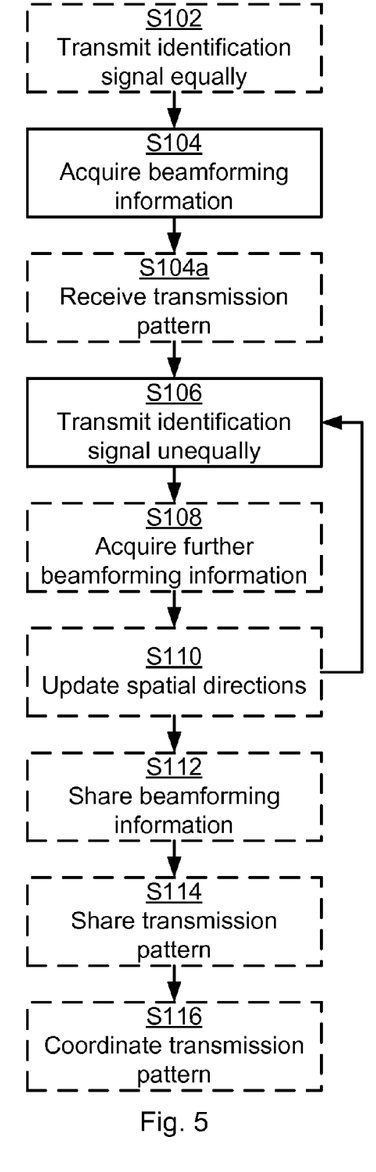
Figure 6:
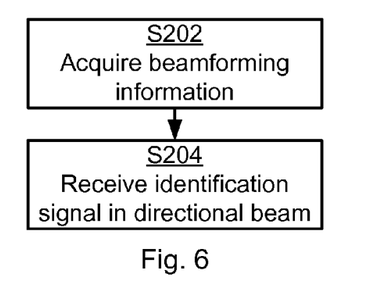
Figure 7:
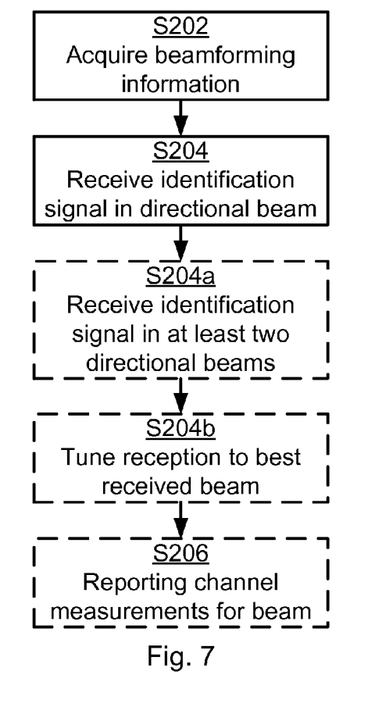

FIGS. 4 and 5 are flow charts illustrating embodiments of methods for adaptive beamforming as performed by the first network device 11. FIGS. 6 and 7 are flow charts illustrating embodiments of further methods for adaptive beamforming as performed by the first network device 11. The methods are advantageously provided as computer programs 42*a*, 42*b*.

Reference is now made to FIG. 4 illustrating a method for adaptive beamforming as performed by the first network device 11 according to an embodiment.

In order for the first network device 11 to be able to perform adaptive beamforming it needs to have access to information disclosing in which directions signals are to be transmitted. The first network device 11 is therefore configured to, in a step S104, acquire beamforming information. The beamforming information indicates spatial directions in which an identification signal is to be transmitted.

Once having access to information disclosing in which directions signals are to be transmitted the first network device 11 then transmits signals. The first network device 11 is thus configured to, in a step S106, transmit the identification signal. The identification signal is transmitted in a transmission pattern using directional beams 13*a*-13*g* in the spatial directions. The identification signal is transmitted towards second network devices 12*a*-12*h*.

The adaptive beamforming is achieved by the identification signal being transmitted using directional beams 13*a*-13*g* such that the identification signal occupies a larger portion of communications resources when transmitted in spatial directions with high second network device presence than in spatial directions with low second network device presence. Further, in terms of transmission, the first network device 11 may be configured to utilize more resources, such as radio units, processing units, and storage units, in the first network device 11 when transmitting the identification signal in spatial directions with high second network device presence than in spatial directions with low second network device presence.

Identification signals, such as broadcast channels, may thereby be beamformed more often in the spatial directions in which the device density is high compared to other directions (where the device density is low). For example, the first network device 11 may transmit identification signals, such as initial synchronization signals and broadcast channel, more often in those directions with high density of second network device 12*a*-12*g*. Also, if the first network device 11 uses beamforming in its receiver, such as for receiving random access signals or other contention based signals, the receiver may be configured to receive more often in those directions with high density of second network device 12*a*-12*g*.

Embodiments relating to further details of adaptive beamforming as performed by the first network device 11 will now be disclosed.

There may be different kinds of second network devices 12*a*-12*h* that are to receive the identification signal from the first network device 11. Different embodiments relating thereto will now be described in turn. According to one embodiment the second network devices 12*a*-12*h* are wireless devices in a cell served by the first network device 11. Hence, in this embodiment the first network device 11 may be a radio access network node and the second network devices 12*a*-12*h* may be wireless devices, such as user equipment. According to one embodiment the second network devices 12*a*-12*h* and the first network device 11 are peer network devices. Hence, in this embodiment the first network device 11 and the second network devices 12*a*-12*h* may both be either radio access network nodes or wireless devices engaged in peer-to-peer (such as device-to-device) communications.

The communications resources may relate to a repetition frequency of transmission, a bandwidth allocation of the identification signal, a width of the directional beam, or any combination thereof. There may be different ways for the identification signal to occupy a larger portion of communications resources when transmitted in spatial directions with high second network device presence than in spatial directions with low second network device presence. Different embodiments relating thereto will now be described in turn.

According to one embodiment the beamforming involves using higher number of directional beams in high density areas. For example, transmitting the identification signal may in this embodiment involve transmitting the identification signal using higher number of directional beams in spatial directions with high second network device presence than in spatial directions with low second network device presence.

According to one embodiment the beamforming involves spending longer time in directional beams in high density areas. For example, transmitting the identification signal may in this embodiment involve transmitting the identification signal using longer time duration in the directional beams in spatial directions with high second network device presence than in directional beams in spatial directions with low second network device presence.

According to one embodiment the beamforming involves transmitting the identification signal more often in directional beams in high density area. For example, transmitting the identification signal may in this embodiment involve transmitting the identification signal more often in spatial directions with high second network device presence than in spatial directions with low second network device presence.

According to one embodiment the beamforming involves using narrower directional beams in high density areas. For example, transmitting the identification signal may in this embodiment involve transmitting the identification signal using narrower beam widths in spatial directions with high second network device presence than in spatial directions with low second network device presence.

According to one embodiment the beamforming involves using a particular order in which the directional beams 13a-13g are used for transmitting the identification signal. For example, assume that the identification signal initially is transmitted in directional beams 13a-13d according to FIG. 12 (i.e., in the order 13a, 13b, 13c, 13d, 13a, . . . ). Assume now that beam 13d is to be used more often. Hence, the identification signal may be transmitted in the order 13a, 13d, 13b, 13d, 13c, 13d, 13a, . . . By interleaving directional beam 13d between the other directional beams 13a-13c delay for second wireless devices 12a-12h covered by directional beams 13a-13c may be avoided and be potentially less for second wireless devices 12a-12h covered by directional beam 13d simultaneously trying to transmit PRACH, thus potentially leading to less congestion in the network. Another option could be to transmit the identification signal in the order 13d, 13d, 13d, 13a, 13b, 13c, 13d, 13d, . . .

As is understood by the skilled person, the above disclosed example embodiments for transmitting the identification signal may be combined. Hence, it may, for example, be possible for the first network device 11 to transmit the identification signal using both a higher number of directional beams and using narrower beam widths in spatial directions with high second network device presence than in spatial directions with low second network device presence.

There may be different ways to define second network device presence. For example, second network device presence may be defined as high density (in unit [devices/m$^3$], i.e., based on the number of physical devices within some region, or high appearance rate in unit [random access attempts/m$^3$/sec], i.e., based the activity of devices within some region, or any combination thereof.

There may be different kinds of information comprised or indicated in the beamforming information. Different embodiments relating thereto will now be described in turn. For example, the beamforming information may indicate location of the second network devices 12a-12h. That is, the beamforming information may comprise information about second network device presence in different directions relative the first network device 11. Hence, according to one embodiment the beamforming information indicates relative location information of second network devices 12a-12h to which the identification signal is to be transmitted. Thereby, an initial access and handover procedure can be performed by the first network device 11 using any possible prior information of spatial direction of the second wireless devices 12a-12h.

There may be different kinds of information sources from which the beamforming information may be derived. For example, the beamforming information may derived from reported precoders from second network devices 12a-12h in a cell served by the first network device 11 with closed loop beamforming, block error rate statistics related to beamforming candidates used for second network devices 12a-12h in a cell served by the first network device 11 with open loop precoding, directions of detected Random Access preambles from second network devices 12a-12h in a cell served by the first network device 11, and estimated Direction of Arrival from uplink transmissions from second network devices 12a-12h in a cell served by the first network device 11, or any combination thereof.

For example, after an initial access and/or handover procedure, the first network device 11 can transmit and receive user data. Based on the initial access, and/or handover procedure, and/or user data transmissions and receiving, the first network device 11 may estimate directions from the first network device 11 to second network devices 12a-12h, thereby deriving beamforming information. From these estimates of directions, first network device 11 may identify one or several directions with high density (i.e., a high presence) of second network devices 12a-12h. These estimated directions may then be used in following initial access and/or handover procedures.

There may be different kinds of identification signals. For example, the identification signal may comprise primary synchronization signals (PSS) and/or secondary synchronization signals (SSS). For example, the identification signal may be a reference signal and/or a broadcast signal. The directional beams may be used for transmission during initial access and/or handover. For example, the identification signal may comprise random access signals or other contention based signals. The directional beams 13a-13g may be used for reception of contention based signals.

There may be different ways for first network device 11 to direct the directional beams. The spatial direction may be either azimuth direction or elevation direction of the first network device 11, or any combination thereof. Hence, the first network device 11 may be configured to perform beam forming only in azimuth direction, only in elevation direction, or both in azimuth direction and in elevation direction.

The beamforming information may not only specify in which direction the beamforming is to be performed, but also when in time the beamforming is to be performed. The direction of the directional beams may vary over time, such as over one day. Particularly, the beamforming information may specify time-of-day dependent directions for the directional beams. These time-of-day dependent directions may vary over time. For example, there may be one set of time-of-day dependent directions to be used during office hours and one set of time-of-day dependent directions to be used outside office hours. There may be one set of time-of-day dependent directions to be used during weekdays and one set of time-of-day dependent directions to be used during weekends. Such time-of-day dependent directions may, for example, be used in scenarios where the directional beams are to serve second network devices 12a-12h operated by office workers.

Reference is now made to FIG. 5 illustrating methods for adaptive beamforming as performed by the first network device 11 according to further embodiments.

There may be different ways for the first network device 11 to transmit the identification signal prior to having acquired the beamforming information. For example, the first network device 11 may be configured to, in an optional step S102, and prior to transmitting the identification signal using directional beams in the spatial directions, transmit the identification signal in spatial directions using directional beams such that the identification signal is occupying equal portions of communications resources in all spatial directions.

There may be different ways for the first network device 11 to acquire the beamforming information. Different embodiments relating thereto will now be described in turn. According to one embodiment the beamforming information is provided as beamforming configuration parameters. According to one embodiment the beamforming information is provided by the transmission pattern. The transmission pattern may be generated by the first network device 11 itself. Alternatively, the first network device 11 may be configured to, in an optional step S104a, receive the transmission pattern. The transmission pattern may then be associated with an identification signal transmission performed by at least one further first network device. The transmission pattern may be received from the at least one further first network device.

There may be different ways for the first network device 11 to adapt its transmission of the identification signal. Different embodiments relating thereto will now be described in turn. For example, the spatial directions in which the identification signal is to be transmitted may be determined from learning (feedback). Particularly, the first network device 11 may be configured to, in an optional step S108, acquire further beamforming information indicating spatial directions in which the identification signal is to be transmitted. This further beamforming information may then be used to update the spatial directions. That is, the first network device 11 may be configured to, in an optional step S110, update the spatial directions in which the identification signal is transmitted using the further beamforming information. Hence, new estimates may be used by the first network device 11 to update the estimates of spatial directions with high second network device presence in an iterative manner.

The first network device 11 may share the beamforming information with other devices. These other devices may be another first network device 11. Hence, the first network device 11 may be configured to, in an optional step S112, share the beamforming information with at least one further first network device.

The first network device 11 may share the transmission pattern with other devices. These other devices may be another first network device 11. Hence, the first network device 11 may be configured to, in an optional step S114, share the transmission pattern with at least one further first network device.

There may be different levels of cooperation between the first network device 11 and the at least one further first network device. According to one example such cooperation involves the transmission pattern. For example, the first network device 11 may be configured to, in an optional step S116, coordinate the transmission pattern with the at least one further first network device. Thereby, the first network device 11 and the at least one further first network device may coordinate their transmission of respective identification signals to minimize mutual interference in regions where both the first network device 11 and the at least one further first network device are enabled to transmit using directional beams.

Reference is now made to FIG. 6 illustrating a method for adaptive beamforming as performed by the first network device 11 according to an embodiment.

The first network device 11 is configured to, in a step S202, acquire beamforming information indicating spatial directions in which an identification signal is to be received from at least one second network device 12a-12h.

The first network device 11 is then configured to, in a step S204, receive the identification signal from the at least one second network device 12a-12h in at least one directional beam 13 indicated by the spatial directions. Reception of the identification signal utilizes a larger portion of communications resources when received in spatial directions with high second network device presence than in spatial directions with low second network device presence.

Embodiments relating to further details of adaptive beamforming as performed by the first network device 11 will now be disclosed.

One example of an identification signal that the first network device 11 may receive in step S204 is a random access signal.

Embodiments relating to kinds of second network devices 12a-12h that are to receive an identification signal from the first network device 11 have above been disclosed with reference to the flowchart of FIGS. 4 and 6. These embodiments also apply to the current embodiments, mutatis mutandis. Hence, the second network device 12a-12h may be a wireless device in a cell served by the first network device 11 or a peer network device such as either a radio access network node or a user equipment engaged in peer-to-peer (such as device-to-device) communication with the first network device 11, wherein the second network device 12a-12h may be configured also for transmitting an identification signal to the first network device 11.

Embodiments relating to the communications resources have above been disclosed with reference to the flowchart of FIGS. 4 and 6. These embodiments also apply to the current embodiments, mutatis mutandis. Hence, the first network device 11 may be configured to adapt its receiver to a repetition frequency of transmission, a bandwidth allocation of the identification signal, a width of the directional beam, or any combination thereof. Further, in terms of reception, the first network device 11 may be configured to utilize more resources, such as radio units, processing units, and storage units, in the first network device 11 when receiving the identification signal in spatial directions with high second network device presence than in spatial directions with low second network device presence.

Embodiments relating to different ways for the identification signal to occupy a larger portion of communications resources when transmitted in spatial directions with high second network device presence than in spatial directions with low second network device presence have above been disclosed with reference to the flowchart of FIGS. 4 and 6. These embodiments also apply to the current embodiments, mutatis mutandis. Hence, the first network device 11 may be configured to adapt its receiver to such different transmissions of the identification signal.

Reference is now made to FIG. 7 illustrating methods for adaptive beamforming as performed by the first network device 11 according to further embodiments.

The first network device 11 may provide at least one further first network device with information that the first network device 11 may use as beamforming information (for example, as in steps S108 and S110 above). The information may be provided by means of channel measurements. Particularly, the first network device 11 may be configured to, in an optional step S206, report channel measurements of the identification signal to the at least one further first network device. Since the first network device 11 is configured to receive the identification signal from the at least one second network device 12a-12h in at least one directional beam 13a-13g the channel measurements as reported in step S206 are thus valid for the at least one directional beam in which the identification was received.

As noted above, the first network device 11 is configured to receive the identification signal from the at least one second network device 12a-12h in at least one directional beam 13a-13g. Assume that the first network device 11 is configured to receive the identification signal from the at least one second network device 12a-12h in at least two directional beams 13a-13g, i.e., that the first network device 11 is configured to, in an optional step S204a, receive the identification signal from the at least one second network device 12a-12h in at least two directional beams 13a-13g indicated by the spatial directions. In order to do so the first network device 11 may be configured to receive the identification signal using directional beams in the spatial directions from which the identification signal is received. Moreover, the identification signal may be received such that the identification signal occupies a larger portion of communications resources when received in spatial directions with high second network device presence than in spatial directions with low second network device presence.

There may be different ways for the first network device 11 to act in such scenarios. For example, the first network device 11 may continue receiving the identification signal in at least two directional beams 13a-13g. Alternatively, the first network device 11 is configured to, in an optional step S204b, tune its reception according to one directional beam of the at least two directional beams best fulfilling a quality criterion. As the skilled person understands, there may be different kinds of quality criteria, such as signal-to-noise ratio, signal-to-noise-and-interference ratio, block error rate, throughput, quality of service, etc.

Some aspects of the second network device 12a-12h will now be disclosed. As has been disclosed above, the second wireless device 12a-12h is configured to receive the identification signal from the first network device 11. As has also been disclosed above, the second network device 12a-12h may transmit an identification signal to the first network device 11. In general terms, the identification signal is a signal identifying the sender of the identification signal. Hence, the identification signal transmitted by the first network device 11 identifies the first network device 11, and the identification signal transmitted by a particular second network device 12a-12h identifies this particular second network device 12a-12h. The second network device 12a-12h may be configured to, upon reception of the identification signal from the first network device 11, perform signal combining of the identification signal as having been transmitted in different directional beams 13a-13g. The signal combining may be maximum ratio combining (MRC). This is only possible if the full channel between the first network device 11 and the second network device 12a-12h is known. The channel is typically not known during synchronization procedures. It may therefore be appropriate for the second network device 12a-12h to have access to a list (or codebook) of combiners with which the second network device 12a-12h can prefilter the received identification signal.

Figure 8:
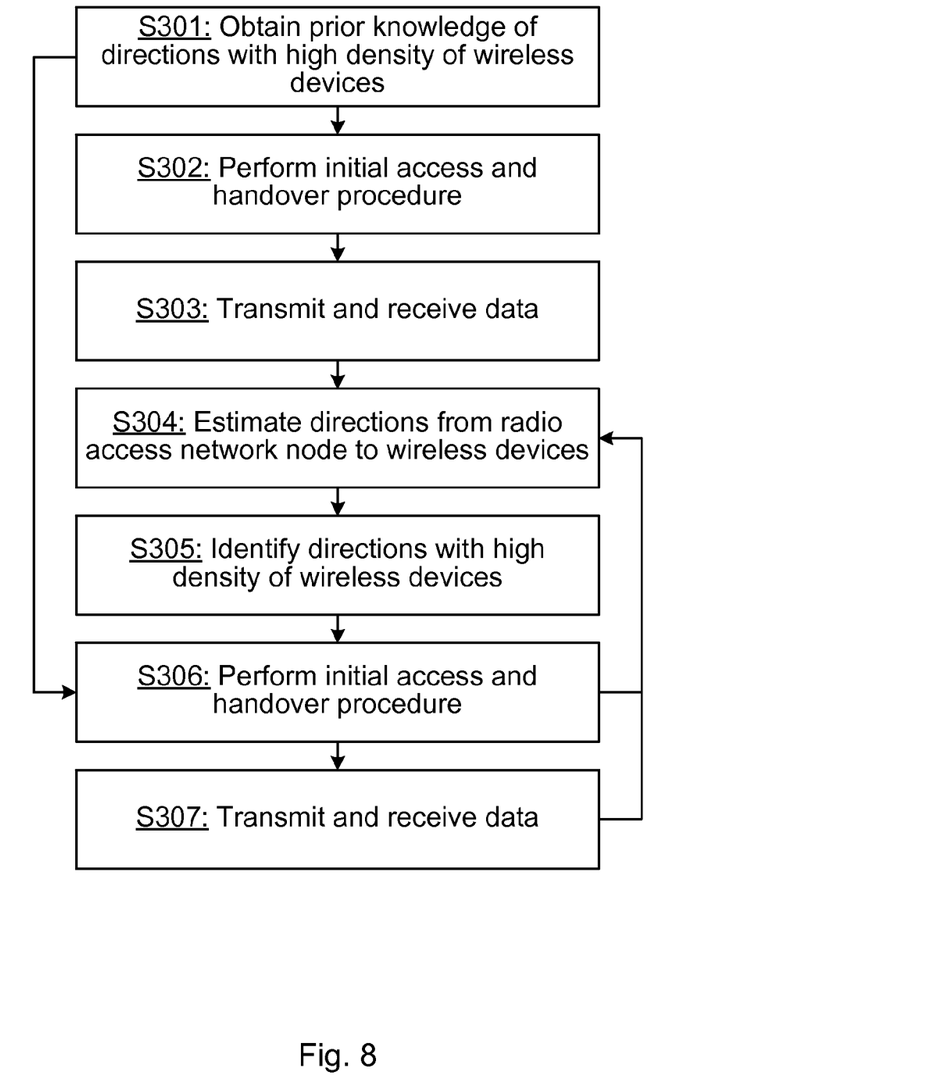

One particular embodiment for adaptive beamforming based on at least some of the herein disclosed embodiments will now be disclosed with reference to the flowchart of FIG. 8. In this particular embodiment the first network device 11 is a radio access network node and the second network devices 12a-12h are wireless devices.

S301: The radio access network node obtains prior knowledge of directions with high density of wireless devices. The radio access network node may execute step S301 by performing step S104 and/or step S108.

S302: The radio access network node performs an initial access and/or handover procedure of at least some of the wireless devices with communications resources distributed to the directional beams 13a-13g as determined by the prior knowledge obtained in step S301. The radio access network node may execute step S302 by performing step S106 and/or step S102.

S303: The radio access network node and the wireless devices exchange data, such as user data and signalling data.

S304: The radio access network node estimates spatial directions from the radio access network node towards the wireless devices for transmitting signals using directional beams 13a-13g. The radio access network node may execute step S304 by performing step S108.

S305: The radio access network node identifies directions with high density of wireless devices. The radio access network node may execute step S305 by performing step S110.

S306: The radio access network node performs an initial access and/or handover procedure of at least some of the wireless devices. The radio access network node now transmits signals in spatial directions and with communications resources distributed to the directional beams 13a-13g based on the directions estimated and determined in steps S304 and S305. The radio access network node may execute step S302 by performing step S106.

S307: The radio access network node and the wireless devices exchange data, such as user data and signalling data.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adaptive beamforming, the method being performed by a first network device, the method comprising:
acquiring beamforming information indicating a plurality of spatial directions that comprises of a first spatial direction (SD) and a second SD, in which random access signals are received and an identification signal is to be transmitted, determining a network device density (NDD) of second network devices in the first SD is greater than a NDD of the second network devices in the second SD; and in response to determining that the NDD of the second network devices in the first SD is greater than the NDD of the second network devices in the second SD:

i) receiving random access signals from the second network devices in the first SD, ii) receiving random access signals from the second network devices in the second SD, wherein the reception of the random access signals from the second network devices is such that random access signals occupies a larger portion of communication resources in the first SD than in the second SD;

iii) transmitting the identification signal in the first SD using a first directional beam, and iv) transmitting the identification signal in the second SD using a second directional beam, wherein the transmission of the identification signal from the first network device is such that identification signal occupies a larger portion of communication resources in the first SD than in the second SD.

2. The method of claim 1, wherein the random access signals are received using a shared random access channel.

3. The method of claim 2, wherein each of the random access signal comprises a random access preamble.

4. The method of claim 3, wherein the first network device transmits to a second network device a random access response in response to the first network device receiving a random access preamble transmitted by the second network device.

5. The method of claim 1, wherein the identification signal comprises a Primary Synchronization Signal (PSS) that corresponds to one of three different physical layer identities.

6. The method of claim 5, wherein the identification signal further comprises a Secondary Synchronization Signal (SSS) that corresponds to one of a plurality of a physical layer cell identity groups.

7. The method of claim 1, wherein the identification signal is transmitted for longer duration in the first SD when compared to the duration in the second SD.

8. The method of claim 1, wherein transmitting the identification signal in the first SD comprises: transmitting the identification signal in the first SD X number of times within a certain length of time, transmitting the identification signal in the second SD Y number of times within said certain length of time, and X is greater than Y.

9. The method of claim 1, wherein the first directional beam has a narrower beam width than the second directional beam.

10. A first network device, the first network device comprising:

a transmitter;

a receiver;

a persistent storage;

a central processing unit (CPU) coupled to the persistent storage, the transmitter, and the receiver, wherein the first network device is configured to:

acquire beamforming information indicating a plurality of spatial directions that comprises of a first spatial direction (SD) and a second SD, in which random access signals are received and an identification signal is to be transmitted;

determine a network device density (NDD) of second network devices in the first SD is greater than a NDD of the second network devices in the second SD; and in response to determining that the NDD of the second network devices in the first SD is greater than the NDD of the second network devices in the second SD:

i) receive random access signals from the second network devices in the first SD, ii) receive random access signals from the second network devices in the second SD, wherein the reception of the random access signals from the second network devices is such that random access signals occupies a larger portion of communication resources in first SD than in second SD;

iii) transmit the identification signal in the first SD using a first directional beam, and iv) transmit the identification signal in the second SD using a second directional beam, wherein the transmission of the identification signal from the first network device is such that identification signal occupies a larger portion of communications resources in the first SD than in the second SD.

11. The first network device of claim 10, wherein the random access signals are received using a shared random access channel.

12. The first network device of claim 11, wherein each of the random access signal comprises a random access preamble.

13. The first network device of claim 12, wherein the first network device transmits to a second network device a random access response in response to the first network device receiving a random access preamble transmitted by the second network device.

* * * * *